US009556321B2

(12) United States Patent
Curry et al.

(10) Patent No.: US 9,556,321 B2
(45) Date of Patent: *Jan. 31, 2017

(54) HIGH DIELECTRIC CONSTANT COMPOSITE MATERIALS AND METHODS OF MANUFACTURE

(71) Applicant: The Curators of the University of Missouri, Columbia, MO (US)

(72) Inventors: Randy D. Curry, Columbia, MO (US); Kevin O'Connor, Columbia, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,503

(22) Filed: Oct. 20, 2014

(65) Prior Publication Data
US 2015/0047190 A1 Feb. 19, 2015

Related U.S. Application Data

(62) Division of application No. 13/428,950, filed on Mar. 23, 2012, now Pat. No. 8,889,776.

(60) Provisional application No. 61/466,604, filed on Mar. 23, 2011.

(51) Int. Cl.
| | | |
|---|---|---|
| C08K 3/00 | (2006.01) | |
| C04B 35/468 | (2006.01) | |
| C04B 35/63 | (2006.01) | |
| H01G 4/20 | (2006.01) | |
| H01Q 1/36 | (2006.01) | |
| B29C 43/00 | (2006.01) | |
| H01B 3/12 | (2006.01) | |
| B82Y 30/00 | (2011.01) | |
| C08K 3/30 | (2006.01) | |
| C08L 101/00 | (2006.01) | |
| B05D 1/00 | (2006.01) | |
| B05D 1/40 | (2006.01) | |
| B29C 39/00 | (2006.01) | |
| C08K 3/22 | (2006.01) | |
| H01B 19/00 | (2006.01) | |
| C08K 3/24 | (2006.01) | |
| B29C 35/08 | (2006.01) | |
| B29K 101/00 | (2006.01) | |
| B29K 509/02 | (2006.01) | |

(52) U.S. Cl.
CPC ............ C08K 3/0033 (2013.01); B05D 1/005 (2013.01); B05D 1/40 (2013.01); B29C 39/003 (2013.01); B29C 43/003 (2013.01); B82Y 30/00 (2013.01); C04B 35/4682 (2013.01); C04B 35/6316 (2013.01); C08K 3/22 (2013.01); C08K 3/24 (2013.01); C08K 3/30 (2013.01); C08L 101/00 (2013.01); H01B 3/12 (2013.01); H01B 19/00 (2013.01); H01G 4/206 (2013.01); H01Q 1/362 (2013.01); B29C 2035/0827 (2013.01); B29K 2101/00 (2013.01); B29K 2509/02 (2013.01); C04B 2235/483 (2013.01); C04B 2235/5427 (2013.01); C04B 2235/5436 (2013.01); C04B 2235/5445 (2013.01); C04B 2235/5454 (2013.01); C04B 2235/5472 (2013.01); C08K 2003/2206 (2013.01); C08K 2003/2237 (2013.01); Y10T 29/49227 (2015.01)

(58) Field of Classification Search
CPC ..................................................... C08K 3/0033
USPC ......................................................... 524/430
See application file for complete search history.

(56) References Cited

U.S. PATENT DOCUMENTS

| | | | |
|---|---|---|---|
| 8,889,776 B2 | 11/2014 | Curry et al. | |
| 2003/0108664 A1* | 6/2003 | Kodas | C09D 11/30 427/125 |
| 2004/0109298 A1* | 6/2004 | Hartman | B32B 27/00 361/762 |
| 2004/0118602 A1 | 6/2004 | Lee et al. | |
| 2005/0080175 A1 | 4/2005 | Paik et al. | |
| 2006/0167139 A1* | 7/2006 | Nelson | B82Y 30/00 523/212 |
| 2007/0060672 A1 | 3/2007 | Kumashiro et al. | |
| 2007/0145453 A1* | 6/2007 | Wu | B82Y 10/00 257/310 |
| 2009/0014333 A1 | 1/2009 | Bhattacharya et al. | |
| 2009/0043398 A1* | 2/2009 | Yakimicki | B29C 41/06 623/23.51 |
| 2012/0245016 A1 | 9/2012 | Curry et al. | |

FOREIGN PATENT DOCUMENTS

| | | |
|---|---|---|
| CN | 1763134 A | 4/2006 |
| CN | 1908063 A | 2/2007 |

(Continued)

OTHER PUBLICATIONS

Office Action from related Japanese Application No. 2014-501281, dated Jan. 26, 2016; 13 pgs.

(Continued)

Primary Examiner — Doris Lee
(74) Attorney, Agent, or Firm — Polsinelli PC

(57) ABSTRACT

The present invention relates to composite materials with a high dielectric constant and high dielectric strength and to methods of producing the composite materials. The composite materials have high dielectric constants at a range of high frequencies and possess robust mechanical properties and strengths, such that they may be machined to a variety of configurations. The composite materials also have high dielectric strengths for operation in high power and high energy density systems. In one embodiment, the composite material is composed of a trimodal distribution of ceramic particles, including barium titanate, barium strontium titanate (BST), or combinations thereof and a polymer binder.

57 Claims, 10 Drawing Sheets

(56) References Cited

FOREIGN PATENT DOCUMENTS

| CN | 101472840 A | 7/2009 |
|---|---|---|
| EP | 1612810 A1 | 1/2006 |
| JP | S5388198 A | 8/1978 |
| JP | H0660719 A | 3/1994 |
| JP | 2005109017 A | 4/2005 |
| JP | 2006019621 A | 1/2006 |
| JP | 2008074699 A | 4/2008 |
| JP | 2009202129 A | 9/2009 |

OTHER PUBLICATIONS

Second Office Action from related Chinese Patent Application No. 201280024626.5, dated Jul. 10, 2015; 29 pgs.

First Office Action from related Chinese Patent Application No. 201280024626.5, dated Aug. 26, 2014; 23 pgs.

Extended European Search Report from related European Application No. 12774897.8, dated Sep. 8, 2014; 10 pgs.

Choudhury, "Dielectric and piezoelectric properties of polyetherimide/BaTiO3 nanocomposites", Materials Chemistry and Physics, 2010, pp. 280-285, vol. 121.

Munro et al., "Agar-Based Aqueous Gel Casting of Barium Titanate Ceramics", International Journal of Applied Ceramic Technology, 2011, pp. 597-609, vol. 8, No. 3.

Tomer et al., "Epoxy-based nanocomposites for electrical energy storage. I: Effects of montmorillonite and barium titanate nanofillers", Journal of Applied Physics, 2010, pp. 074116-1-074116-14, vol. 108, No. 7.

Xie et al., "Core-shell structured poly(methyl methacrylate)/BaTiO3 nanocomposites prepared by in situ atom transfer radical polymerization: a route to high dielectric constant materials with the inherent low loss of the base polymer", Journal of Materials Chemistry, 2011, pp. 5897-5906, vol. 21, No. 16.

\* cited by examiner

HIGH DIELECTRIC CONSTANT COMPOSITE MATERIALS AND METHODS OF MANUFACTURE

CROSS REFERENCE TO RELATED APPLICATIONS

This application is a divisional application of U.S. patent application Ser. No. 13/428,950, entitled "High Dielectric Constant Composite Materials And Methods Of Manufacture," filed on Mar. 23, 2012, now U.S. Pat. No. 8,889,776 issued on Nov. 18, 2014, which claims priority to U.S. Provisional Application No. 61/466,604, filed on Mar. 23, 2011, and entitled "High Dielectric Constant Composite Material," both of which are incorporated herein by reference in their entireties.

FEDERALLY SPONSORED RESEARCH OR DEVELOPMENT

This invention was made with government support under Grant No. N000-14-08-1-0267 from the Office of Naval Research. The Government has certain rights to this invention.

FIELD OF THE INVENTION

The invention relates generally to the field of composite materials, and, more particularly, to a composite material with a high dielectric constant. The composite materials may be used in a variety of applications requiring high-dielectric materials, including antennas, capacitors, and high voltage insulators, among others. The invention further relates to methods of manufacturing high dielectric constant composite materials and devices incorporating the composite material.

BACKGROUND OF THE INVENTION

Ceramics are often used in applications that require materials with high dielectric constants, such as in capacitors and energy storage devices. Conventional ceramic materials, however, are typically brittle and susceptible to fracturing under tensile and torsion stresses. Additionally, conventional ceramic materials exhibit a low dielectric strength, limiting their application in high voltage, high power, or high energy storage systems.

Existing efforts to compensate for the inherent brittle nature and low dielectric strength of ceramic material rely on incorporating epoxies or other polymeric macromolecules into a mixture with high dielectric constant ceramic particles. Existing efforts however, do not achieve the ceramic particle packing fraction required to achieve a high effective dielectric constant for the composite. The current efforts also produce composites containing voids, which decrease the dielectric constant and the dielectric strength of the composite.

Therefore, there remains a need for dielectric materials having high dielectric constants at a range of high frequencies that also possess a high dielectric strength and have robust mechanical properties and strengths.

SUMMARY OF THE INVENTION

The present invention relates to composite materials having a high dielectric constant and high dielectric strength, methods of producing the composite materials, as well as various devices and structures, such as antennas, capacitors, and high-voltage insulator assemblies incorporating the composite materials. In one embodiment, the high dielectric constant composite material includes a distribution of high dielectric constant ceramic particles and a polymeric material that is mixed with the particles and polymerized in-situ. In various embodiments, the dielectric constant is greater than 20.

The ceramic particles may be of a single particle size ranging between about 2 nm to about 220 μm. Alternately, the distribution of high dielectric constant ceramic particles may be a bimodal distribution, a trimodal distribution, a quadmodal distribution, or higher. The distribution of the high dielectric constant ceramic particles has a first volume fraction of 50% or greater and the polymeric material has a second volume fraction of 50% or less.

The diameter of the ceramic particles of a largest distribution of the trimodal distribution may be between about 10 μm and about 220 μm, the diameter of the ceramic particles of the intermediary distribution may be between about 500 nm and about 5 μm, and the diameter of the ceramic particles of a smallest distribution of the trimodal distribution may be less than about 500 nm, and as small as 2 nm. In one embodiment, the trimodal distribution includes at least one first ceramic particle having a first diameter in a first range between 10 μm and 220 μm, at least one second ceramic particle having a second diameter in a second range between 500 nm and 5 μm, and at least one third ceramic particle having a third diameter in a third range between 50 nm and 500 nm. In another embodiment, the trimodal distribution includes at least one first ceramic particle having a first diameter in a first range between 0.5 μm and 3 μm, at least one second ceramic particle having a second diameter in a second range between 65 μm and 150 μm, and at least one third ceramic particle having a third diameter in a third range between 150 μm and 500 μm.

Any high dielectric particles, including ceramic particles may be used in the composite material. In various embodiments, the ceramic particles are perovskites, including compounds thereof. More specifically, the perovskites may include barium titanate, strontium titanate, barium strontium titanate, lead zirconate titanate, lead magnesium niobate-lead titanate, and combinations thereof. Further, the surface portions of each of the ceramic particles that are not in contact with the surface of another ceramic particle are in contact with the polymeric material or a liquid filler.

The polymeric material substantially fills a void space between two or more of the high dielectric constant ceramic particles and, in one embodiment, the polymeric material binds directly to the surface of the high dielectric constant ceramic particles. In one embodiment, the polymeric material is an inorganic-organic coupling agent. Specifically, the binder material may be a polysilsesquioxane formed from coupling agents including silanes, titanates, zirconates, or combinations thereof. For example, the silane coupling agent may be any trialkoxysilane, including those selected from a group consisting of vinyltrimethoxysilane, triethoxyvinylsilane, aminopropytriethoxysilane, or combinations thereof.

During fabrication, the composite material is compressed in a die press according to one embodiment. In various embodiments, the compression may further facilitate contact and binding between the polymeric material and the ceramic particles. A precursor of the polymeric material may be mixed with the distribution of high dielectric constant ceramic particles before compression in the die press. Further, the precursor may be polymerized and cross-linked in-situ by at least one of heat, a chemical catalyst, or ultraviolet light.

In various embodiments, the composite material further includes a dielectric fluid that may be separate and distinct from the ceramic particle and polymeric material mixture. The dielectric fluid or a mixture of dielectric fluids may be incorporated into the composite material after the polymerization of the polymeric material. Optionally, the dielectric fluid may also have a high dielectric constant. The dielectric fluid may be selected from a group consisting of water, an alkylene carbonate, an oil, or combinations thereof and the dielectric fluid may include silane, titanate, zirconate, or combinations thereof.

After polymerization or other formation of the polymer binder, the dielectric fluid is impregnated into the composite material to fill or displace any voids remaining in the composite material, thereby increasing both the dielectric constant and the dielectric strength of the composite material. The composite material may be submerged and/or bathed in the dielectric fluid. Alternately, the dielectric fluid may be forced into the pores of the ceramic material using a vacuum or other pressurized system.

A method for manufacturing a composite material having a high dielectric constant includes mixing a ceramic powder having a distribution of ceramic particles with a liquid polymer precursor into a paste, placing the paste into a die, compressing the paste, and polymerizing the polymer precursor to form a polymer binder that binds directly to ceramic particles of the ceramic powder distribution. The method may further include compacting the ceramic powder distribution such that the compacted distribution has a packing factor of at least 80%, and impregnating the composite material with a dielectric liquid to fill voids in the composite material and eliminate air from the composite material. In one embodiment, the dielectric fluid is injected or forced into the pores of the ceramic material by a pressurized system, such as a vacuum.

In various embodiments, the paste is compressed by a pressure of about 30 tons per square inch in a die press. Polymerizing the polymer precursor to form a high dielectric constant polymer further includes at least one of heating the die containing the pressed paste for at least thirty minutes and cooling the high dielectric constant composite material, providing a chemical catalyst, or exposing the polymer precursor to ultraviolet light. After polymerization, the method may include removing the composite material from the die, machining the composite material into a desired shape, sanding the composite material, and applying one or more electrodes to the composite material.

In one embodiment, an antenna assembly includes a composite material having a high dielectric constant, where the composite material further includes a distribution of high dielectric constant ceramic particles and a polymeric material. The antenna assembly also includes conductive sheets or wires that may include copper. The antenna assembly may be a helical antenna, dielectric resonator antenna, or any other suitable antenna. Typically, antennas incorporating the high dielectric constant composite material disclosed herein may be fabricated with smaller dimensions relative to similar conventional antennas.

In another embodiment, the high dielectric constant composite material may be incorporated into a capacitive or high-energy storage device. The capacitive device has a high dielectric constant and high dielectric strength. In addition, the capacitive device includes two or more electrodes separated by the high dielectric constant composite material. The capacitive device may be formed as a single layer or a multi-layered structure, and the capacitive device may be used for high-density energy storage and filtering. In addition, the capacitive device incorporating the high dielectric constant composite material may be used as a substitute for conventional capacitors in a variety of applications.

DETAILED DESCRIPTION OF THE INVENTION

Figure 1A:
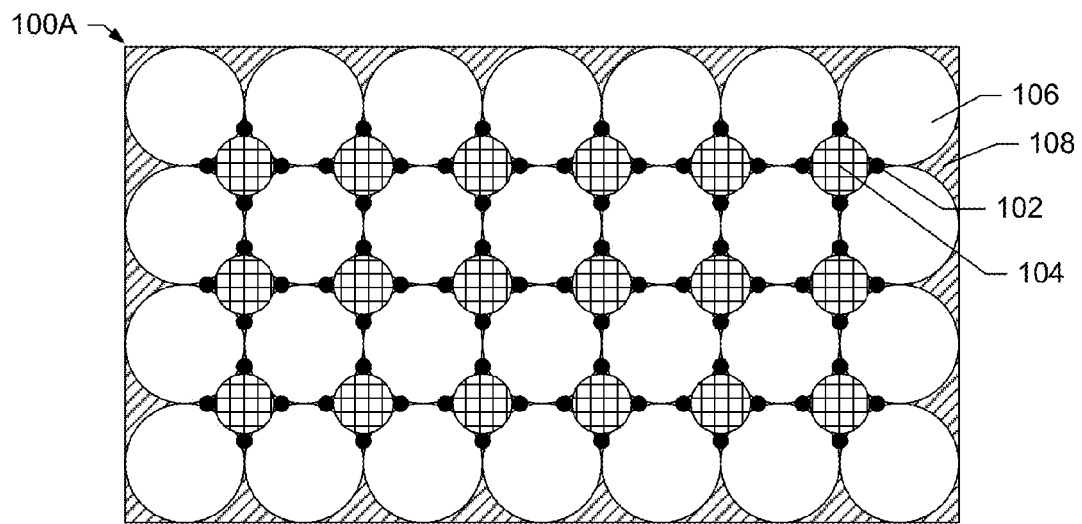
FIGS. 1A-C are sectional views of a high dielectric constant composite material according to various embodiments.

The present invention relates to a composite material having a high dielectric constant. In particular, the present invention relates to composites that have a high dielectric constant over a range of high frequencies, a high dielectric strength, and that can be formed or machined into complex geometries. The ceramic composite material may be used to manufacture antennas, radio frequency transmission components, microwave transmission components, high energy density capacitors, high-voltage insulators, and other applications that may benefit from a composite material with a high dielectric constant. As used herein, a high dielectric constant refers to a material having a dielectric constant of about 20 or greater.

In various embodiments, the high dielectric constant composite material includes a distribution of ceramic particles ranging from about 2 nm to about 2000 µm. Other embodiments include distributions of ceramic particles ranging from about 10 nm to about 1000 µm, 50 nm to about 500 µm, or 200 nm to about 220 µm. In other embodiments, the high dielectric constant composite material contains ceramic particles of a uniform size. Similarly, the high dielectric constant composite material may contain a bimodal, trimodal, or greater distribution of particles. Preferably, the high dielectric constant composite material has a trimodal distribution of ceramic particles. In all embodiments, the ceramic particle distribution is configured to increase the ceramic packing factor (i.e. the fraction of the volume in the composite structure that is occupied by the ceramic particles), the dielectric constant, and other beneficial properties of the ceramic composite material.

In one embodiment, the high dielectric constant composite material is manufactured using in-situ polymerization in which polymer precursors are mixed and compressed with the ceramic particles prior to the polymerization and cross-linking of the precursors. In-situ polymerization further increases the packing factor of the ceramic composites. In addition, in-situ polymerization allows for the direct bonding between the polymer and the surfaces of the inorganic ceramic particles. Typically, the polymer is a substantially insulating or non-conductive dielectric polymer that does not contain any metal. As such, the matrix of non-metallic dielectric polymer formed after polymerization allows for higher breakdown voltages and extends the lifetime of the composite material.

In one embodiment, the high dielectric constant composite material may be impregnated with a dielectric fluid, and preferably a fluid with a high dielectric constant. The dielectric fluid fills any remaining voids in the composite material to eliminate dead space occupied by air, thereby improving the dielectric properties of the composite material.

The high dielectric constant composites disclosed herein are suitable for use with applications requiring machinable dielectric material having robust mechanical properties, a high dielectric strength, complex shapes, or low temperature forming environments.

The Ceramic Particles

Figure 1B:
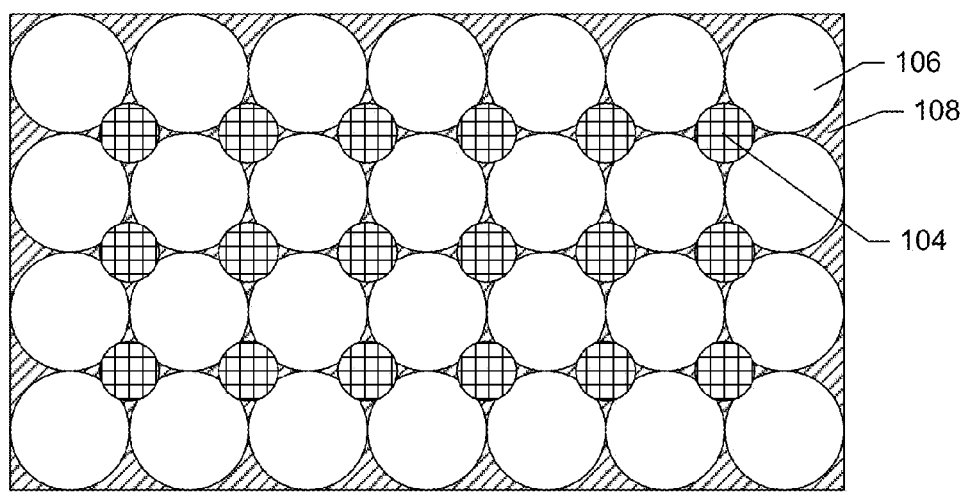
Figure 1C:
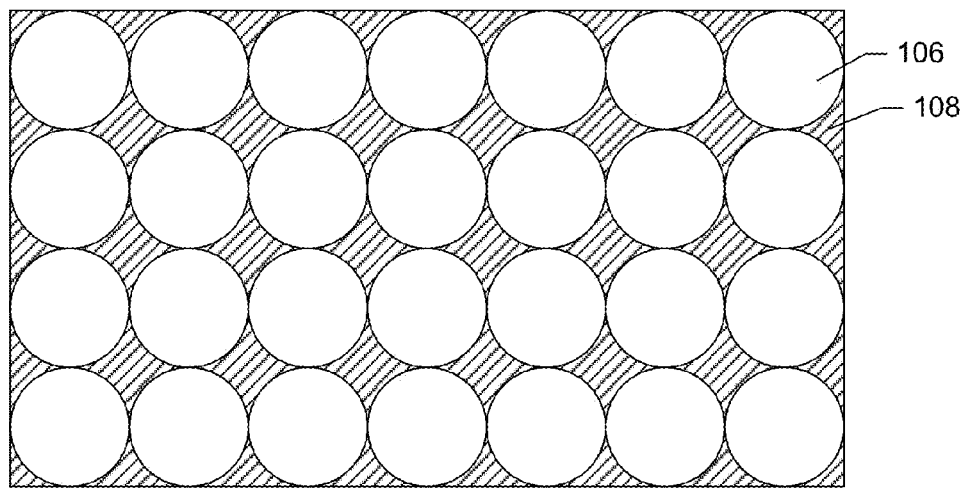

Referring now to FIGS. 1A-C, various embodiments of the particle distributions for high dielectric constant composite materials 100A-C are depicted. As shown the composite materials 100A-C include a distribution of at least one variety of dielectric particles 102-106 that are bound together by a polymer binder 108. For illustrative purposes, the particles 102-106 are shown as having a regular pattern of distribution in FIGS. 1A-C. In various embodiments, the particles 102-106 may be randomly arranged to result in random particle packing. Despite the random arrangement of the particles 102-106, the particles are dispersed evenly throughout the composite material by stirring and mixing, such that the particle density and other properties of the composite, including the dielectric constant and dielectric strength, are uniform throughout the material.

The composite material may be made using particles of any high dielectric constant. Preferably, the particles 102-106 are ceramic, including but not limited to barium titanate ($BaTiO_3$), strontium titanate ($SrTiO_3$), or barium strontium titanate (BST) particles with the formula $Ba_{(1-x)}Sr_xTiO_3$. The BST particles may be incorporated as independent particles or they may be included in the composite material 100 as a constituent of a $BaTiO_3$ particle composite. Other suitable materials for the composite particles include lead zirconate titanate (PZT) a ceramic perovskite with the formula $Pb[Zr_xTi_{1-x}]O3$, where $0 \leq x \leq 1$). In addition, other perovskite materials, non-perovskite materials, and non-linear ferroelectric or anti-ferroelectric materials may also be used.

Perovskite particles are desired, as they possess a number of characteristics, such as magnetoresistance, robust dielectric properties, and an inherent polarity of the lattice structure, particularly when the unit cell has a tetragonal structure. In addition, the flexibility of bond angles inherent in the perovskite structure permit a variety of molecular distortions, including Jahn-Teller distortions, which may be desired in certain electronic applications.

Further, the particles 102-106 may be refractory ceramic particles, non-refractory ceramic particles, or combinations thereof. The ceramic particles 102-106 may be chosen such that the Curie temperature of the particles is much different than the contemplated temperature of operation for the composite materials 100A-C to ensure relative stability in the permittivity of the composite materials. For example, the particles 102-106 having a Curie temperature that differs from the operating temperature of the final composite material by about 20° C. or greater may be chosen. Alternatively, the ceramic particles 102-106 may be chosen such that the Curie temperature of the particles is at or near the contemplated operating temperature for the composite materials 100A-C to maximize the dielectric constant of the composite materials. Furthermore, ceramic particles 102-106 having varied Curie temperatures may be selected in order to broaden the temperature range at which the composite material's dielectric strength and dielectric constant are at peak values or otherwise stable.

Figure 2:
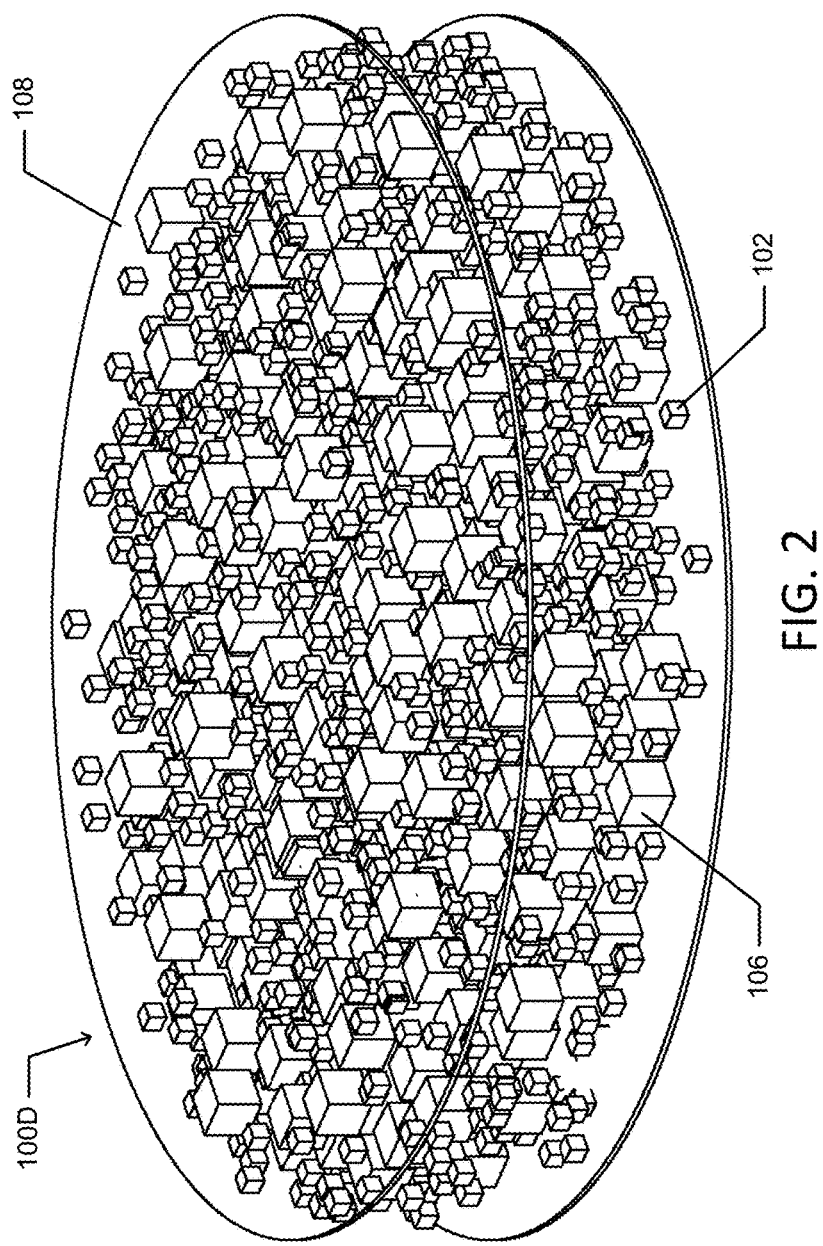
FIG. 2 is a sectional view of a high dielectric constant composite material according to one embodiment.
Figure 3:
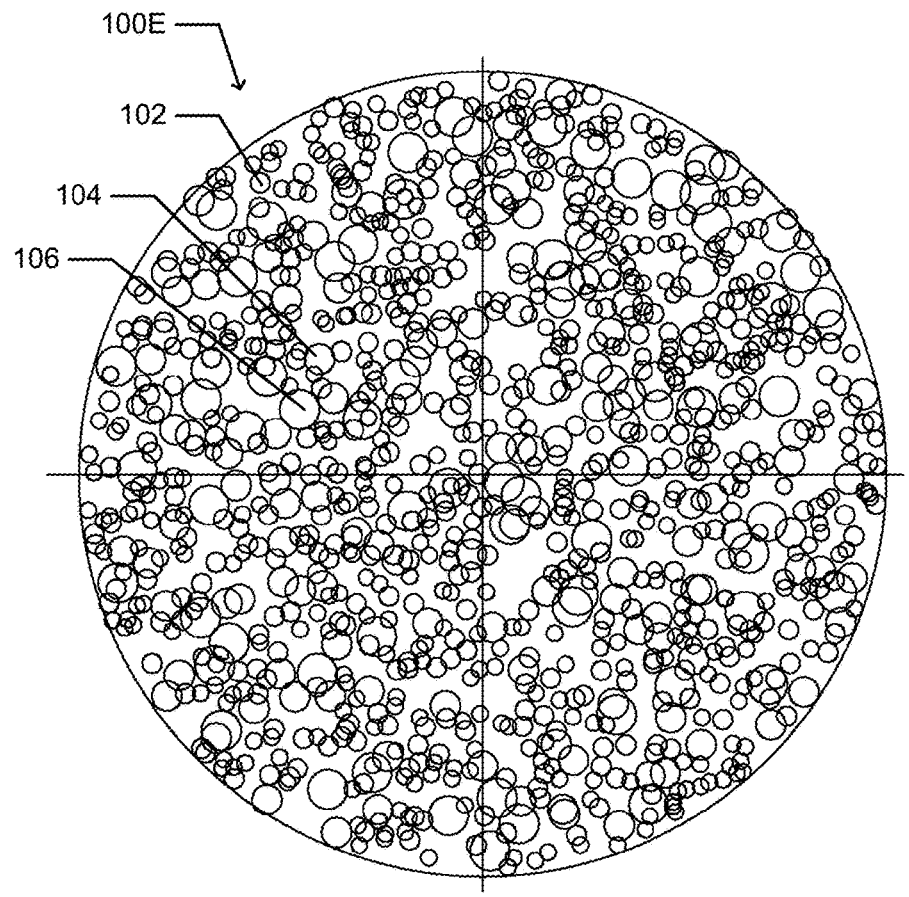
FIG. 3 is a sectional view of a high dielectric constant composite material according to one embodiment.
Figure 4:
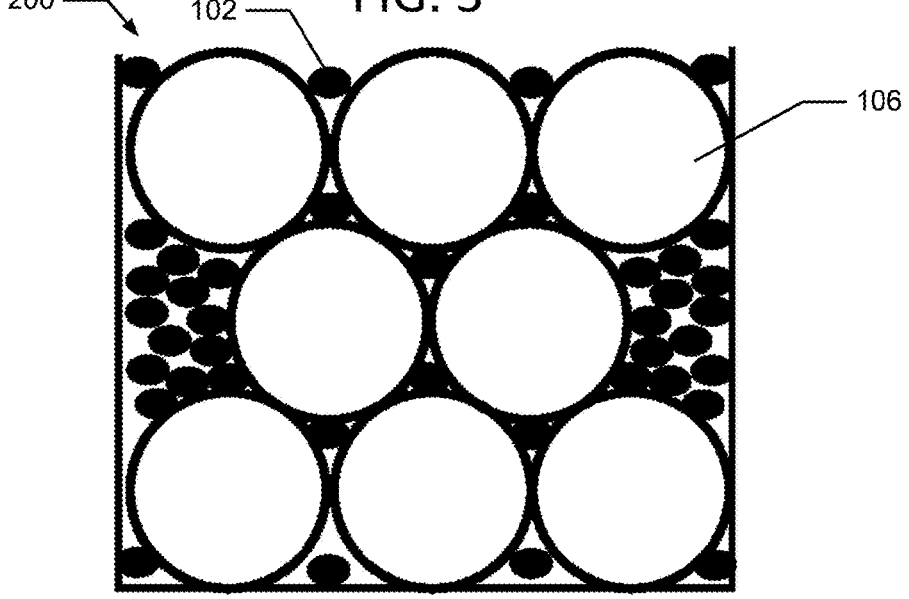
FIG. 4 is a sectional view of a high dielectric constant composite material mixture according to one embodiment.

Although shown as spherical in FIGS. 1A-C, the ceramic particles 102-106 may have a variety of shapes, including but not limited to spherical and irregular shapes. FIGS. 2-3 depict composite materials 100D and 100E having distributions of cubic and spherical particles, respectively. FIG. 4 depicts a mixture 200 of particles 102 and 104 that may be used to manufacture composite material, similar to the composite material 100B. Irregular shapes are preferred for all particles 102-106, as irregular shapes typically result in high packing densities, which in turn yield a higher dielectric constant for the composite materials 100A-E. As the particles 102-106 may be any shape, the term diameter as used when referencing particle size, may refer to a nominal dimension of the particles. For example, the diameter of irregular shaped particles may refer to a mean diameter of the particle. Similarly, the diameter of predominately-cubic particles may refer to an edge length of the particle. For other particle shapes, such as elliptical, the diameter may refer to the greatest axial or transverse length.

The composite material 100A, as shown in FIG. 1A, has a trimodal distribution of the dielectric particles 102-106 that range in diameter from less than approximately 2 nm to greater than approximately 2000 μm. The particles 102-106 in each size range may be uniform. Alternately, the particles within each size range may be any of a variety of sizes within the size range. Similarly, the particles 102-106 within each size range (i.e. small, intermediate, and large) and across each size range may be the same material or be of different materials and compositions. For example, a combination of barium titanate, strontium titanate, and barium strontium titanate particles may be used within each size range and across size ranges.

The distribution and range of particle sizes are selected to increase the ceramic packing factor and the dielectric constant of the composites 100A-C. While ceramic particles of any size may be used, the ranges for the smallest particles 102 may be limited by manufacturing limits and the desire to keep the small particles from agglomerating, as agglomerations of small particles will degrade the dielectric characteristics of the composite materials 100A-C. In one embodiment, the small particles 102 are approximately 50 nm in diameter; however, smaller particles as small as 2 nm may be used. Conversely, particles larger than 50 nm can be used as the small particles 102. It is preferably, however, that the smallest achievable nanoparticles are used to maximize packing of the particles.

Typically, the largest particles 106 are limited only by practical considerations relating to the thickness of the final composite material 100A-C. For example, it is preferred that any single large particle 106 is less than or equal to about 10% of the total thickness of the composite material 100A-C. For example, a composite material that is approximately 2-2.5 mm thick may be fabricated using large particles 106 approximately 220 μm in size. Similarly, thin composite films may be made using large particles 106 that have smaller dimensions.

In one embodiment, the size range for the intermediate particles 104 is calculated such that the range of intermediate particle sizes is separated by a common factor from the size range for the smallest particles 102 and the size range for the large particles 106. For example, when using 50 nm small particles 102 and 50 μm large particles 106, the ratio of the large particle size to the small particle sizes is 1000. To determine the size range of the intermediate particles 104, the square root of 1000 (approximately 31.6) is used as factor to determine an intermediate particle size of approximately 1.58 μm (i.e. 50 nm×31.6 or 50 μm/31.6). In other embodiments, the size range for the intermediate particles 104 may be closer to the size range of the large particles 106 or closer to the size range of the small particles 102.

The ceramic particles 102-106 within each desired size distribution may be purchased commercially, or alternately, produced by milling large ceramic particles into the desired sizes. In various embodiments, the distribution of particle sizes may be optimized by using formulas similar to those used in various concrete or explosive manufacturing processes. In addition, the ceramic particles may be sintered before use.

By way of example and not limitation, the composite material 100A may contain a trimodal distribution of ceramic particles consisting of $BaTiO_3$ large particles 106 having diameters between about 40 μm and about 220 μm, $BaTiO_3$ intermediate particles 104 with diameters between about 500 nm and about 5 μm, and small particles 102 composed of $BaTiO_3$ or BST with diameters less than about 500 nm. In one embodiment, the smallest particles may have diameters of approximately 2 nm or less.

Preferably, the ratio of each size distribution as well as the volume fraction for each particle size is calculated to achieve the highest packing factor and to minimize the volume of the polymer binder 108 within the composite materials 100A-C. As used herein, the volume fraction refers to the volume of a constituent (e.g. particle(s) or polymer) divided by the volume of all the constituents of the mixture. For example, in one embodiment of the composite material 100A, having a trimodal distribution of particles, the ratio of the large particles 106, the intermediate particles 104, and the small particles 102, respectively, is approximately 65:25:10 wherein the large particles constitute the largest proportion of the composite mass and volume. In another example, ratios of approximately 65-80% large particles, approximately 15-20% intermediate particles, and approximately 5-15% small particles may be used. While any other ratio may be used, it is desirable that the ratios for the distribution of particles is determined based on the sizes of the particles and the void fraction for each distribution of the particles. As such, the largest particles 106 typically have the largest proportion of the mass and volume, while the intermediately sized particles have the second largest proportion.

In various other embodiments, the composite material may be composed of particles within a single size range as shown in FIG. 1C, or the composite material may have a bimodal distribution of particles as shown in FIG. 1B. Other distributions, including quadmodal or greater may be used. Further, the sizes of the particles used in forming the composite materials need not be in "adjacent" size ranges. For example, a composite material may be formed using a mixture of large particles 106 and small particles 102, as shown in FIG. 4.

Figure 5A:
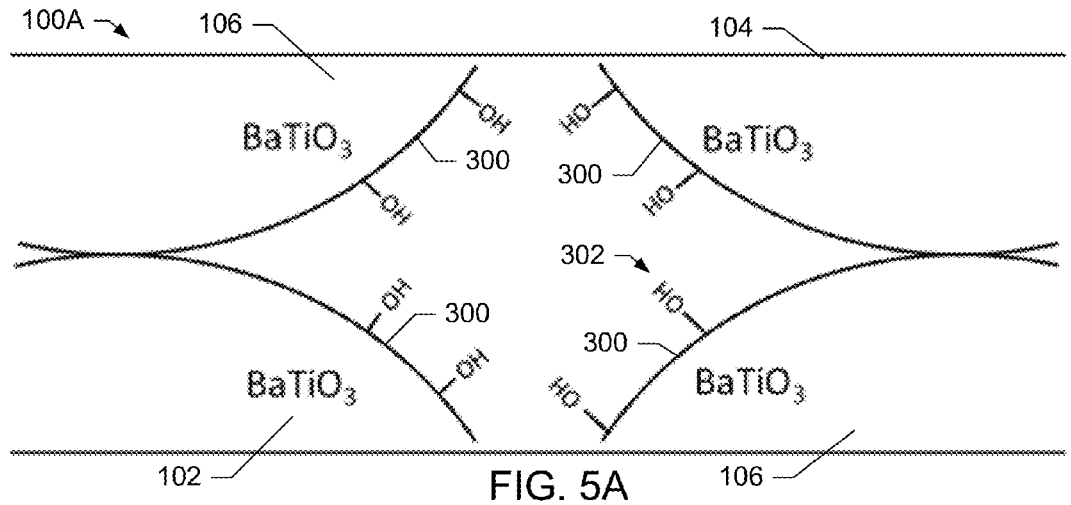
FIGS. 5A-C depict a sequence of functionalizing and binding particles of the high dielectric constant composite material according to one embodiment.
Figure 5B:
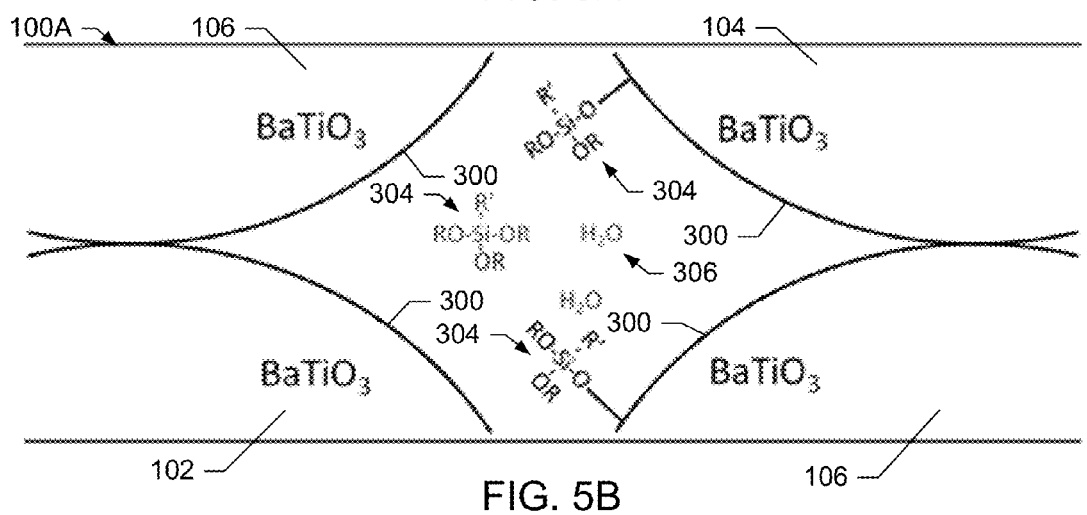
Figure 5C:
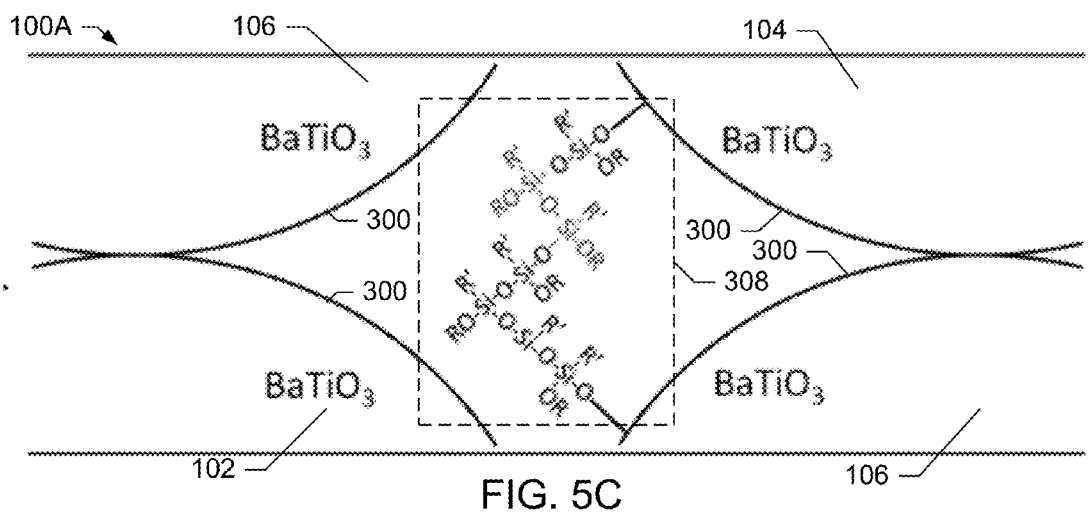

In various embodiments, the surfaces of the ceramic particles 102-106 are functionalized to increase the direct bonding between the particles and the polymer binder. There are a multitude of ways in which the surface can be functionalized. For example, each particle 102-106 may be functionalized by hydroxylating the surface 300 to introduce a hydroxyl (—OH) group 302, as shown in FIGS. 5A-C. The hydroxyl groups 302 may be introduced by treating the particles 102-106 with hydrogen peroxide; however, any other suitable method for hydroxylating the particle surfaces without unduly modifying the particles may be used.

Once the surfaces of the ceramic particles 102-106 have been hydroxylated, silanes and zirconates, for example, may be used to functionalize the surface of the ceramic particles. By way of example, and not limitation, a heated solution of a silane-based polymeric precursor 304, such as the byproduct of vinyltrimethoxysilane and water, 306 may function as both a surface treatment to functionalize and bond directly to the particle surfaces and a binding material to form a highly cross-linked structure 308 between all of the ceramic surfaces 102-106.

The Polymer Binder

The polymer binder 108 may be any dielectric polymer, including but not limited to cyanate esters or polycyanurates. Preferably, the polymer binder 108 is a polymer material that can be irreversibly cured, although other polymer materials may be used. The polymer binder 108 may also be any polymer or polymer precursor that, preferably, has a small molecular size, is capable of binding directly to the particle surfaces, and is capable of forming highly cross-linked polymer networks. Alternately, other embodiments may use polymers or polymer precursors that do not necessarily have these characteristics. These include gelling polymers and cellulose-based polymers, among others.

In one embodiment, the polymer binder 108 is formed from a polymeric precursor that is polymerized in-situ to bind directly to the ceramic particles 102-106. In other embodiments, the polymer binder 108 is formed from the melting of a gelling polymeric precursor, such as agar, that swells in the presence of certain solvents, such as water. In these embodiments, the polymer binder 108 is formed when the mixture of the gelling polymeric precursor, the solvent, and the particles 102-106 is cooled and the solvent is removed.

Preferably, the polymer binder 108 or polymeric precursors do not contain metal particles. A composite material having a non-metallic polymer matrix allows for higher breakdown voltages and a longer life span of the composite material.

When using a polymeric precursor, the polymer precursor is mixed with the distribution of ceramic particles 102-106 and allowed to penetrate through the distribution to contact the surface of each of the particles. For example, a silane-based polymer precursor, such as a trialkoxysilane and more specifically vinyltrimethoxysilane, triethoxyvinylsilane, aminopropyltriethoxysilane, or combinations thereof, may be used to form the polymer binder 108. In addition, other silane, zirconate or titanate-based coupling agents or polymer precursors that polymerize to form polysilsesquioxanes may be used. Preferably, the polymer precursors have physical and chemical characteristics that allow them to penetrate through the mixture to the particle surfaces 300 and to bind directly to the surfaces of the particles 102-106. Preferably, the polymer precursor has a viscosity low enough to flow between the ceramic particles and coat the particle surfaces 300. Under pressure and optionally, heat, applied during formation of the composite materials 100A-E, the polymer binder 108 and/or the polymeric precursor penetrates the nanometer and sub-nanometer level imperfections on the ceramic particle surfaces 300. The polymer binder 104 therefore eliminates any air voids at the surface boundaries of the particles 102-106. By way of example and not limitation, silane, titanate, and/or zirconate-based polymeric precursors are used to facilitate direct binding between the ceramic particle surfaces 300 and to form the highly cross-linked polymer matrix, such as the matrix 308.

In various embodiments, the dielectric constant of the final composite material 100A-E can be optimized for use based upon the selected polymer binder 104. In one example, a desirable silane-based polymeric precursor has a silane concentration higher than typical silane-based polymer precursors such that there is no need for an additional coupling agent to bind the inorganic ceramic particles 102-106. The elimination of extraneous binding additives, such as additional polymeric macromolecules further improves the ceramic packing factor, thereby increasing the dielectric constant of the composite materials 100A-E.

In one embodiment, the polymer binder 108 is composed of a cyanoresin. The cyanoresin binder will yield a composite material 100A-E, having a dielectric constant that may vary from between about 10 to about 55 at a frequency of hundreds of MHz. For example, the polymer binder may be a commercially available product such as CR-S manufactured by Shin-Etsu Chemical Co., Ltd of Tokyo, Japan. CR-S is a cyanoethylated cellulose polymer having a high dielectric constant, good strength and is machinable.

In another embodiment, the dielectric constant of the composite materials 100A-E is increased by using a gelling polymeric precursor, preferably agarose, which is typically in the form of agar. The gelling polymer may be a biopolymer that is naturally derived or synthetically produced. The gelling polymeric precursor is melted in a solvent and compacted into a composite mold with the distribution of ceramic particles 102-106. The composite mold is then cooled under pressure allowing the gelling polymeric precursor to swell in the presence of the solvent. The composite mold is subsequently reheated to a temperature below the melting temperature of the polymeric precursor to remove the solvent, thereby forming the polymer binder 108. As a result, the volume of the polymer binder 108 is reduced from that of the previously swollen polymeric precursor without changing the overall structure of the composite material.

The reduced volume of the polymer binder 108 may create voids or cavities around the ceramic particles 102-106. A dielectric liquid is then impregnated within the composite material to fill and displace all of the cavities or voids within the composite material and to surround the surfaces 300 of the ceramic particles 102-106. Other polymeric precursors may also be used, including gelatin, carrageen, or any other precursor for a polymer binder 108 that will swell in the presence of the solvent but will not absorb and swell in the presence of the dielectric liquid.

The Dielectric Liquid

The dielectric liquid is a filler fluid that may be impregnated into the composite material to penetrate into and fill any remaining voids within the composite material. The dielectric fluid also coats, at the nanometer and sub-nanometer level, any exposed surfaces 300 of the ceramic particles. The addition of the dielectric liquid can increase both the dielectric constant and the dielectric strength of the composite by displacing voids in the material, reducing the porosity of the composite material, and enhancing the boundary interface of the ceramic particles. The dielectric fluid can be impregnated into the formed composite material by submerging the material in the dielectric fluid. The dielectric fluid may further infuse into the composite material via capillary action alone, or may be forced into the material with the aid of a vacuum or other pressurized system.

In one embodiment, the dielectric fluid has a high dielectric constant. For example, the high dielectric constant may be, but is not limited to, water, glycerine, and alkylene carbonates such as ethylene carbonate, propylene carbonate, glycerine carbonate, butylene carbonate, and combinations thereof. Conversely, a dielectric fluid having a low dielectric constant may be used to increase the dielectric strength of the composite while, to a lesser extent, increasing the dielectric constant of the composite material. Example dielectric fluids having low dielectric constants include oils, such as those used in electrical insulators. Preferably, the dielectric liquid has a high dielectric constant, low viscosity, low dielectric losses, and a low evaporation rate.

The dielectric fluid may be impregnated into composite materials formed by the in-situ polymerization of the polymer binder, as well as those formed from the gelling polymeric precursor. In addition, composite materials that are infused with the dielectric liquid may optionally be coated with any suitable gas-impermeable material to prevent or reduce evaporation of the dielectric liquid. For example, the composite material may be coated with silane, titanate, and/or zirconate-based polymers.

In another embodiment, a composite material having a dielectric constant of approximately 100 at frequencies between 100 and 1000 MHz may be made using silane, titanate, and zirconate chemicals that form polysilsesquioxanes after in-situ polymerization. The polymer precursors containing these compounds and the resulting polysilsesquioxanes have a small molecule size and are suitable for binding directly with the ceramic particle surface and forming highly cross-linked polymer networks.

In yet another embodiment, a composite material having a dielectric constant of approximately 550 at frequencies between 100 and 1000 MHz may be made using a gelling polymeric precursor that swells in the presence of water. Preferably, the gelling polymeric precursor swells in the presence of water but not in the presence of alkylene carbonates. Further, the preferred gelling polymeric precursor can be melted before mixing with the ceramic particles 102-106, has a high strength when dried, has a high melting temperature, and is a biomaterial.

Fabricating the Composite Material

As previously described, the ceramic particles 102-106 may be obtained commercially or may be formed during a milling process. In one embodiment, where the ceramic particles are formed by milling, a solvent such as methyl ethyl ketone is used to prevent agglomeration of the particles. Additional solvents, including but not limited to acetone, methyl propyl ketone, polymethylmethacrylate, or dichloromethylene may also be used. In addition, a surfactant may be added to the milling process to prevent agglomeration. By way of example and not limitation, the surfactant may be oleic acid, alkylbenzene-sulfonic acid, or phosphate ester. Preferably, the surfactant is a polar additive. In addition, the surfactant may act to functionalize the surfaces of the ceramic particles to enhance bonding with the polymer binder.

In various embodiments, the ceramic particles may be sintered to produce hardened particles before mixing with the polymeric precursors or binders. The sintered particles have reduced porosity which will decrease voids within the particles, increase the particle packing fraction of the particles, and prevent or at least minimize the infiltration of the polymeric precursors or binders into the particles.

In one embodiment, a mixture of the ceramic particles and a polymer precursor containing silane, titanate, or zirconate, such as vinyltrimethoxysilane or triethoxyvinylsilane, is further mixed with water and prepared at a light boil while stirring. For example, the mixture may be prepared at a temperature between about 100° C. and about 200° C. Heating the mixture increases the rate at which the surfaces of the ceramic particles are functionalized and increases the rate of formation for the polysilsesquioxane network.

The composite material is further formed by dry pressing in a die to shape the material. For example, a paste composed of the ceramic particles 102-106, the polymer precursors, and any surfactants are pressed in a die. Typically, the die is pressed using mechanical or hydraulic means to compact the paste to the shape of the die. In other embodiments, the composite material may be formed by isostatic pressing, where the paste is isostatically pressed using a flexible membrane acting as a mold. While pressing the composite paste is the preferred method of fabrication, the composite materials may also be formed by spin coating or solution casting.

In various embodiments, the composite material is pressed at a pressure from about 100 pound per square inch (PSI) to well over 30 metric tons per square inch. The composite material 100 may be formed by bidirectional or unidirectional pressing technique, although other pressing techniques may be used. In one embodiment, bidirectional pressing eliminates a density gradient that may form in the composite material and provides a uniform dielectric constant throughout the composite material. Conversely, if a gradient density is desired, the density of particles can be varied throughout the composite material by implementing a unidirectional pressing process to fabricate the composite material.

Subsequent to or concurrent with pressing the paste, the die may be heated to facilitate in-situ polymerization of the polymer precursors, thereby forming the polymer binder 104. In other embodiments, the polymer precursors may be polymerized or cured using ultraviolet (UV) radiation or by the addition of a catalyst to bring about chemical polymerization. In one embodiment, the polymer binder 108 binds directly to the surface of the ceramic particles 102-106 and forms a highly-crosslinked structure. As such, there is no need for additional polymers to function as binders.

In various embodiments, the dielectric fluid having a high dielectric constant is added after polymerization of the polymer precursor to fill any voids that may remain between the polymer binder 108 and ceramic particles 102-106. In particular, the filler liquid improves the boundary interface at the nanometer and sub-nanometer level on the surface 300 of the ceramic particles 102-106.

The final composite materials may be coated to prevent the evaporation of an infused dielectric liquid and to reduce the porosity of the composite material. The composite materials may then be cut, machined, and or sanded to the desired size. Additional finishing may include the addition of one or more electrodes to the final composite material. By way of example, the electrodes may be platinum, gold, or any suitable conducting material. In one embodiment, the electrodes are sputtered directly onto the composite material to eliminate any air gaps between the electrodes and the composite material.

In various embodiments, the in-situ polymerization process allows for particle packing factors of at least 80% to be achieved and correspondingly higher dielectric constants to be observed. The in-situ polymerization process also allows the loss tangent and the dielectric constant to be simultaneously tuned to desired requirements as determined by the final application of the composite material 100. The polysilsesquioxane used to bind the matrix of particles eliminates the need for a high viscosity polymer and epoxy to bind the particles.

The Composite Material

Figure 6:
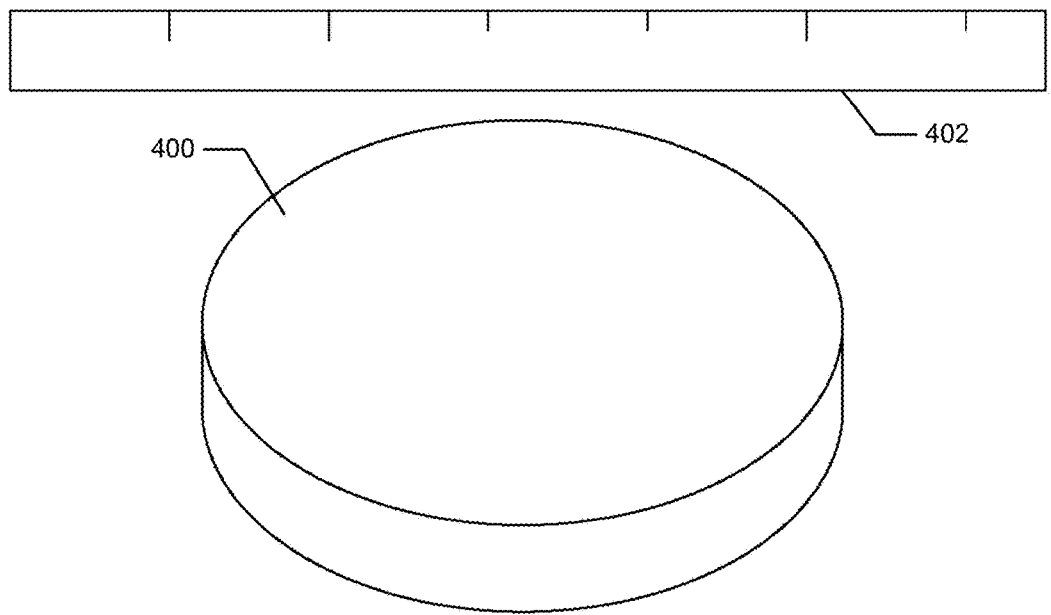
FIG. 6 is a plan view of a machined high dielectric constant composite material according to one embodiment.
Figure 7:
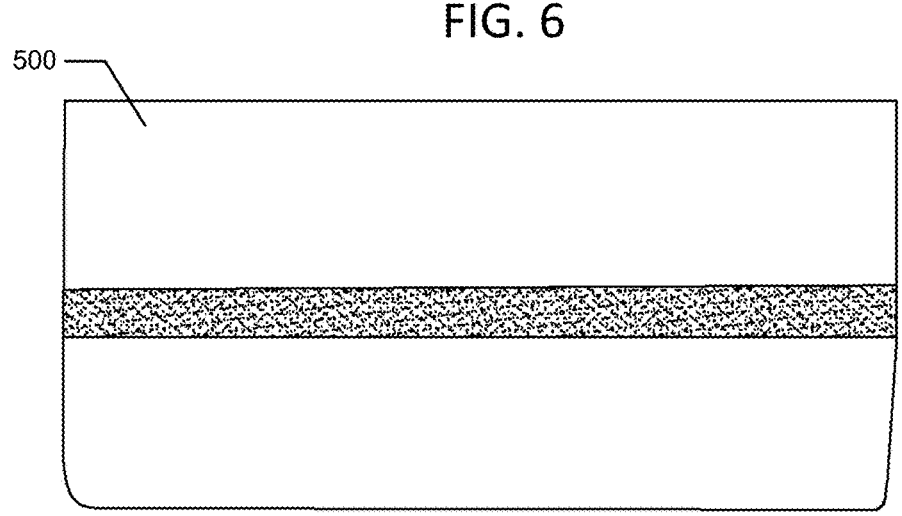
FIG. 7 is a plan view of a machined high dielectric constant composite material according to one embodiment.
Figure 8A:
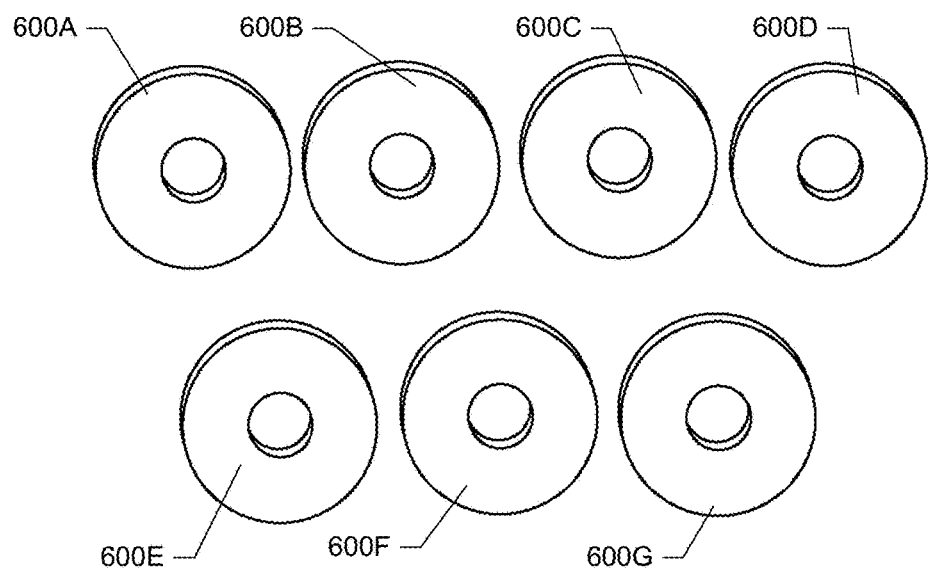
FIGS. 8A-B are plan views of a machined high dielectric constant composite material according to one embodiment.
Figure 8B:
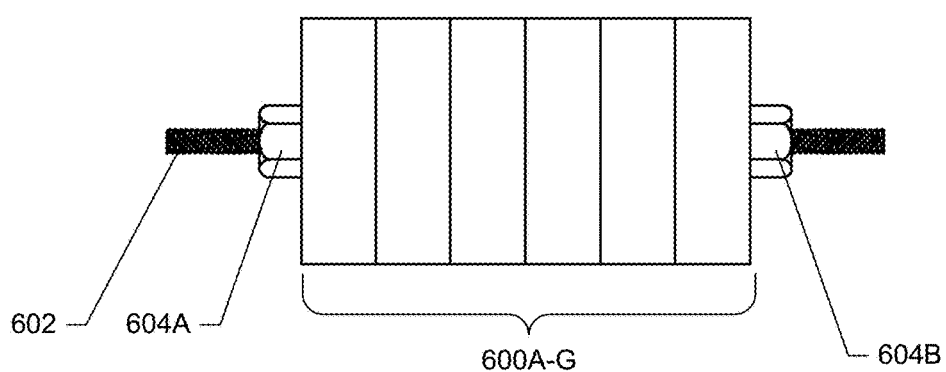
Figure 9:
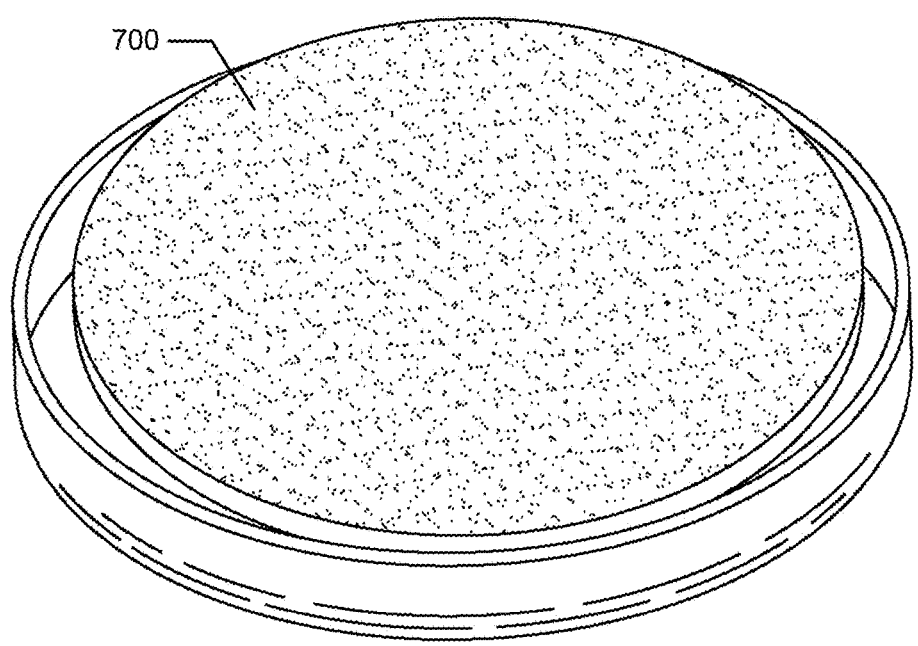
FIG. 9 is a plan view of a machined high dielectric constant composite material according to one embodiment.

Examples of machined high dielectric constant composite materials are shown in FIGS. 6-9. As shown in FIG. 6, the composite materials 100A-E may be cut and machined into a solid disc 400. A ruler 402 is depicted to provide a sense of scale; however, the composite materials may be fabricated to any size and configuration. FIG. 7 is a photograph of a composite material that has been machined into substrate 500 for receiving additional elements. FIG. 8A depicts a composite material that has been machined into a number of annular discs 600A-G. As shown in FIG. 8B, the annular discs 600A-G may be mounted onto a rod 602 and secured together by fasteners 604A-B. FIG. 9 depicts a composite material that has been fabricated as a disc 700. In addition, single thin layer sheets or multiple-layer composite capacitors may also be fabricated using the high dielectric composite materials.

Figure 10:
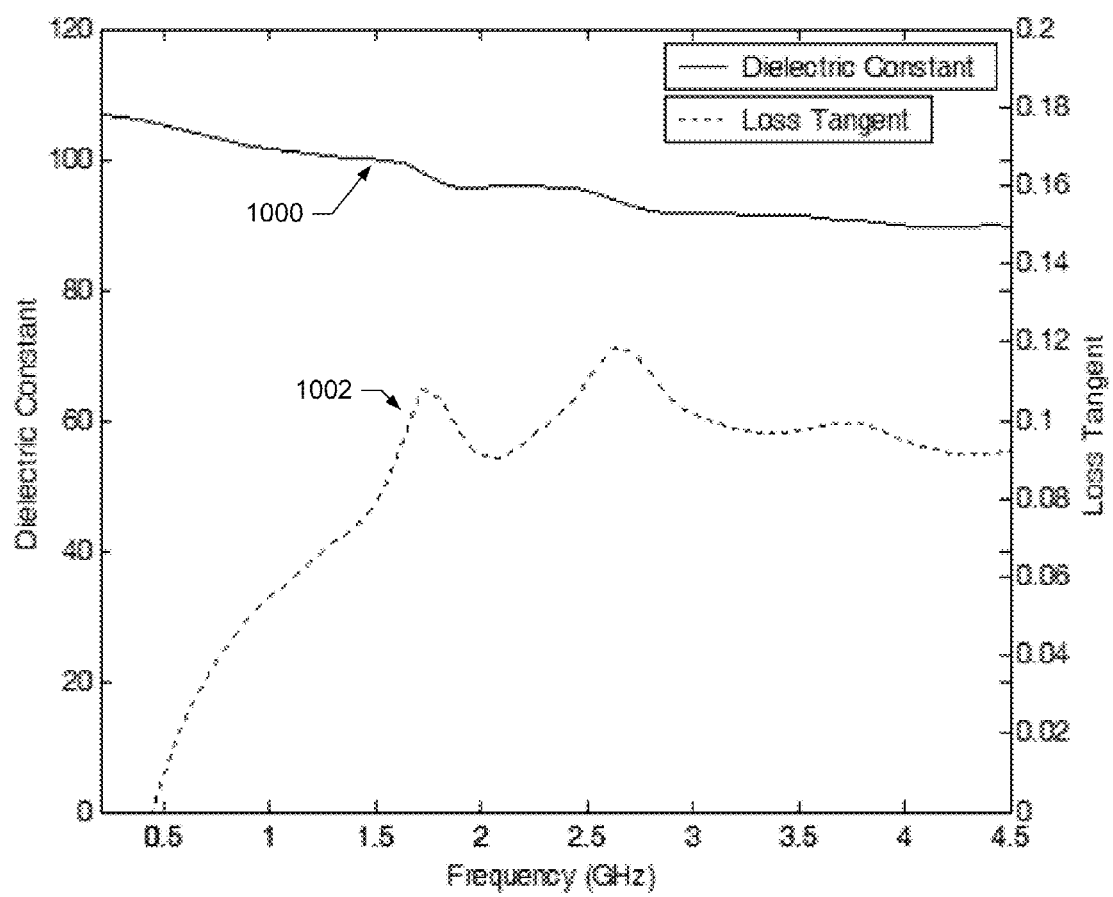
FIG. 10 is a graph illustrating a dielectric constant range and a loss tangent range for a high dielectric constant composite material according to one embodiment.

As shown in FIG. 10, a profile 1000 of the dielectric constant for a composite material having an average dielectric constant of approximately 100 actually varies from approximately 108 to approximately 90 or +/−10% over a frequency range from 200 MHz to 4.5 GHz. As shown, a profile 1002 of the loss tangent over the entire frequency range is less than 0.12 and below 500 MHz, the loss tangent is less than 0.05. As previously described, the loss tangent and dielectric constant may be pre-determined by the selected particle mixture, the heat and pressure applied during fabrication, and the period over which the heat and pressure are applied. In one embodiment, a loss tangent below 0.08 at 2 GHz has been achieved, while in other embodiments, loss tangents less than 0.001 are possible. The low loss tangent significantly expands the variety of applications for using the high dielectric constant composite material.

Figure 11:
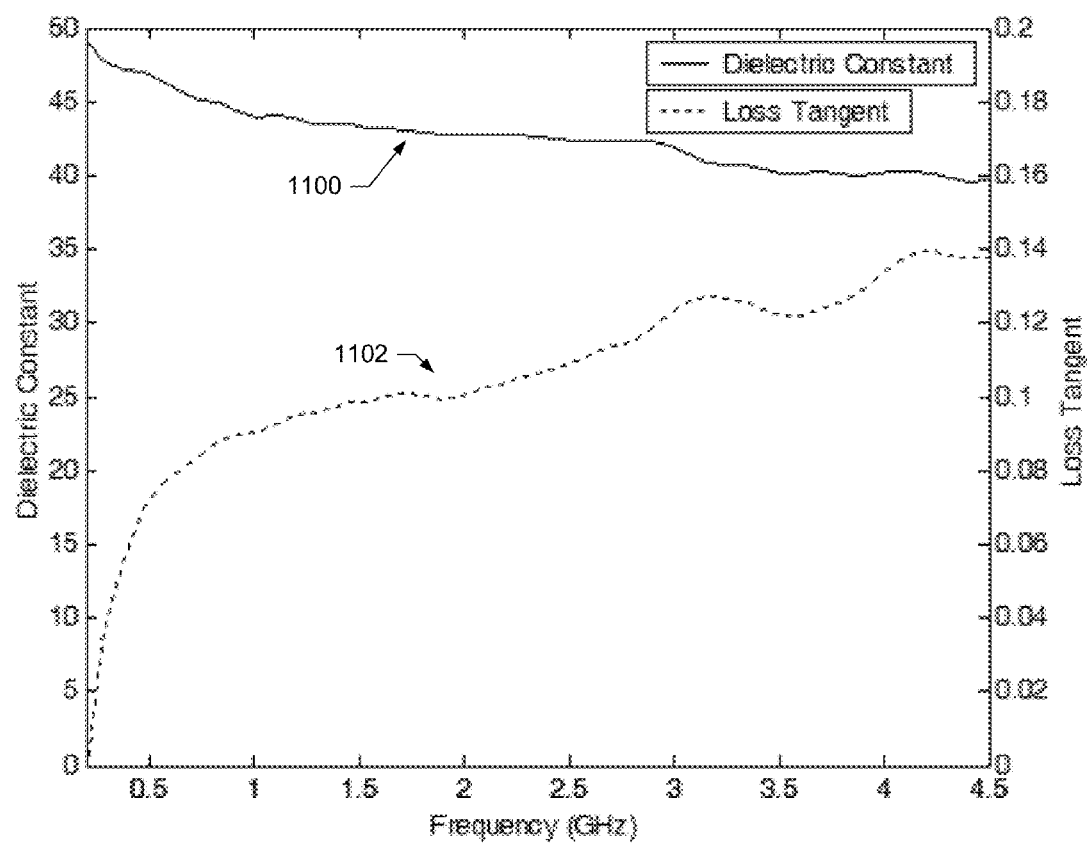
FIG. 11 is a graph illustrating a dielectric constant range and a loss tangent range for a high dielectric constant composite material according to one embodiment.
Figure 12:
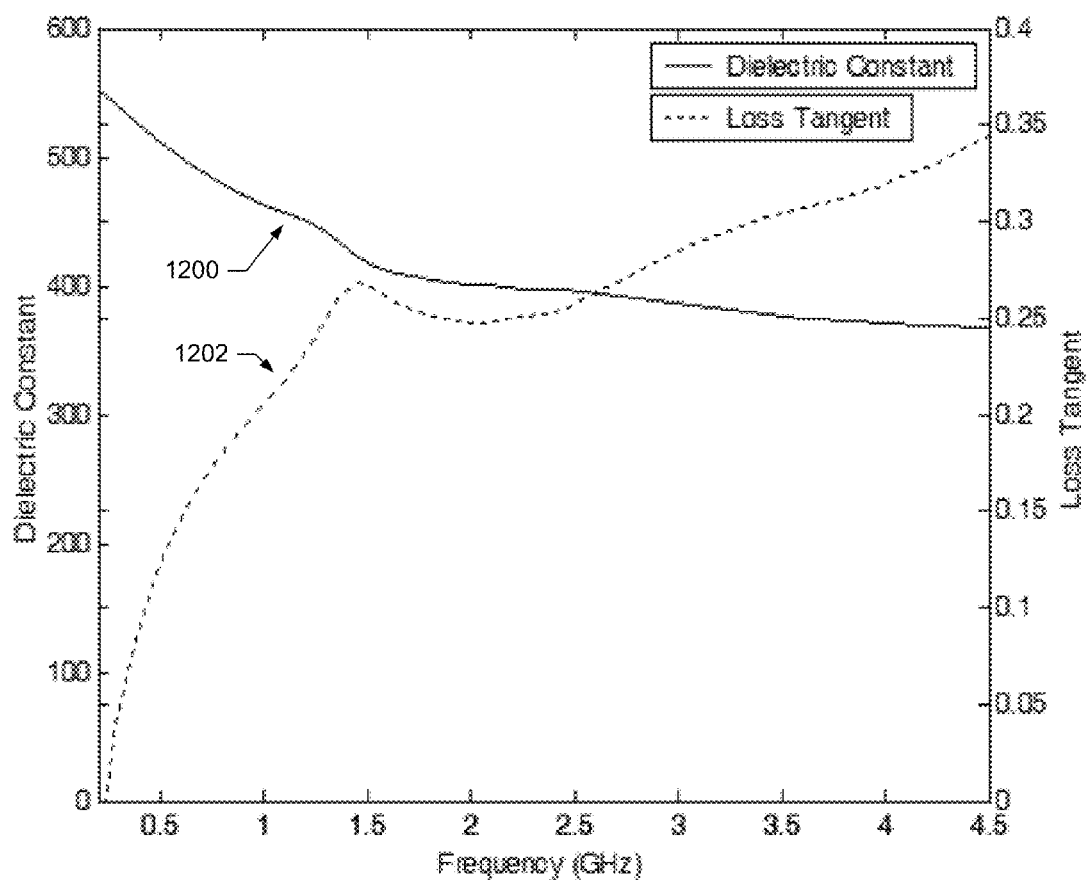
FIG. 12 is a graph illustrating a dielectric constant range and a loss tangent range for a high dielectric constant composite material according to one embodiment.

The range of dielectric constants and loss tangents for a composite material having an average dielectric constant of approximately 45 is shown in FIG. 11. As shown, the profile 1100 of the dielectric constant varies from approximately 49 to approximately 39 over the frequency range from 200 MHz to 4.5 GHz. The profile 1102 of the loss tangent over the entire frequency range is less than 0.14 and below 500 MHz, the loss tangent is less than 0.08. FIG. 12 depicts the profile 1200 of the dielectric constant range and loss tangent range for a composite material having a peak dielectric constant of approximately 550. As shown, the dielectric constant varies from approximately 550 to approximately 400 over the frequency range from 200 MHz to 4.5 GHz. The profile 1202 of the loss tangent over the entire frequency range is less than 0.35 and below 500 MHz, the loss tangent is less than approximately 0.125. It is believed that the actual dielectric constant of the composite materials, as shown in FIGS. 10-12 may be approximately 10% higher than shown due, in part, to imperfections in the methods of measurement and surface imperfections in the tested composite materials and the testing apparatus.

In operation, the electric field of the high dielectric constant composite materials has been found to be in the range of about 1-1.84 MV/cm for single breakdowns. With variations to the mixing techniques, as disclosed herein, the electric field breakdown characteristics can be improved to well over 4 MV/cm, in some embodiments. Therefore, the high dielectric constant composite materials may have an energy storage density of over 200 J/cm$^3$ and up to 1000 J/cm$^3$. In one embodiment, the high dielectric constant composite material has an energy density at room temperature of approximately 20 J/cm$^3$. As such, low loss capacitors, either single layer or multilayer, can be fabricated using the in situ polymerization process disclosed herein. Further, the composite material has been produced having a dielectric constant over 550 at 200 MHz and as high as 56000 at 20 KHz.

Exemplary Uses for the Composite Material

The high dielectric constant composite materials 100A-E, 400, 500, 600A-G, and 700 are suitable for a variety of applications, including but not limited to antennas, capacitors, high-energy storage devices, and high-voltage insulators. The high frequency properties of the high dielectric constant composite materials make them an ideal material for radio frequency and microwave transmission components, including but not limited to antennas and microwave substrates. The high dielectric constant materials can also be used for tuning microwave cavities, high energy density capacitors, and high frequency capacitors. By way of example and not limitation, the high dielectric composite material is suitable for use in high power antennas. As such, the size of dielectric loaded antennas can be minimized by incorporating the high dielectric constant composite materials of the present disclosure. In particular, the composite materials may be incorporated into helical antennas, dielectric resonator antennas, or any antenna which may benefit from and whose dimensions may be reduced because of the inclusion of the composite material. For example, according to one embodiment, antennas incorporating the high dielectric constant composite disclosed herein may be fabricated with a six to ten-fold reduction in size. In other embodiments, the antennas incorporating the high dielectric constant composite material may be reduced even further to dimensions approaching the Chu-Harrington limit (Chu-limit).

Typically, one or more dimensions of an antenna are a function of the wavelength of the electromagnetic wave propagating in the antenna material. As such, the antenna size for a given frequency is approximately proportional to one over the square root of the dielectric constant. In another aspect, the composite material 100 can be used to fabricate antennas, including broadband antennas, approximately one-tenth the size or less of conventional antennas that use an air dielectric.

In addition to antennas, the composite material may be used to improve the function and shrink the dimensions of conventional capacitors. Capacitance between two points is proportional to the dielectric constant of the material separating those two points. By incorporating a composite material with a high dielectric constant, the area of the electrodes required for a given capacitance is reduced in proportion to the increase in the dielectric constant over a conventional dielectric. Therefore, capacitors incorporating the high dielectric constant composite material can be made more compact than traditional capacitors. Additionally, the energy stored in a capacitor increases by the square of the voltage across it. By incorporating the high dielectric constant material with a high dielectric strength compared to traditional high dielectric constant ceramic materials, the energy capable of being stored in the same volume is increased by the square of the increase of the dielectric strength over the conventional high dielectric constant material. Since the energy density of a capacitor is proportional to the dielectric constant and the square of the electric field within the dielectric, the energy density in capacitors incorporating the composite material with a high dielectric constant and a high dielectric strength can be orders of magnitude greater than those achieved with conventional low dielectric constant materials and conventional high dielectric constant ceramics.

The composite materials may also be incorporated into high-voltage insulators. The composite materials allow for greater control and field shaping of electrical fields. Field shaping may further allow the dimensions of the insulators, in particular the length, to be greatly decreased.

High Dielectric Constant Composite Material Preparation Methods

Example 1

By way of example and not limitation, an exemplary method used to prepare the high dielectric constant composite material with a verified dielectric constant of between about 75-140 at frequencies ranging between 200 MHz and 4.5 GHz is provided. Initially, approximately 250 ml of water and 250 ml of triethoxyvinylsilane were poured into an open beaker in a fume hood. The liquids were mixed with a magnetic stirrer at a temperature just below the boiling point of the mixture. The mixture was removed from the heat source and stirring was suspended when the mixture became miscible.

The solution was cooled to room temperature for immediate use. Alternately, the solution may be chilled for long-term storage. While the solution was cooling to room temperature, a mixture of ceramic powder was prepared. The mixture was composed of 65 wt % BaTiO$_3$ particles with diameters between 65 μm and 150 μm, 25 wt % BaTiO$_3$ particles with diameters between 0.5 μm and 3 μm, and 10 wt % BaTiO$_3$ and BST particles with diameters less than 100 nm. The ceramic powder was mixed with a mixer mill for approximately two minutes. Caution was exercised to avoid excessive mixing time that could have resulted in milling the larger particles down to smaller sizes.

The miscible solution cooled to room temperature was added to the powder mixture, while manually stirring. The miscible solution was added until a paste formed. The paste had a light consistency but was viscous enough to hold its shape. The paste was then placed in a dry pressing die and packed lightly to ensure an even distribution of the material.

The die was placed on a lab press stand and the press was activated to apply force to the top and the bottom pistons of the die assembly. Approximately, 30 metric tons per square inch was applied to the die. The force was applied to the die, while any excess fluid that emerged from the die was removed. While, the force was still applied, the die was heated to a temperature of approximately 100° F. by a heating element.

The temperature of the die was held at the desired level for approximately thirty minutes, and then the heating element was deactivated, while the die and pressed composite were allowed to cool to room temperature. After cooling, the composite was removed from the die, machined, and sanded to the desired dimensions. Lastly, electrodes were applied to the composite material 100 and a number of tests were performed to determine the dielectric constant and loss tangent of the composite material.

Example 2

By way of example and not limitation, another exemplary method is provided for producing a composite material with a dielectric constant between 400 and 600 at frequencies between 200 MHz and 4.5 GHz. Initially, a mixture of perovskite ceramic particles was prepared. The mixture was composed of 72 wt % $BaTiO_3$ particles with diameters between 65 μm and 150 μm, 21 wt % $BaTiO_3$ particles with diameters between 0.5 μm and 3 μm, and 7 wt % $BaTiO_3$ and BST particles with diameters less than 100 nm. The ceramic powder was mixed with a mixer mill for approximately two minutes. Caution was exercised to avoid excessive mixing that could have resulted in milling the larger particles down to smaller sizes.

Agar, primarily as agarose, was used as the polymer binder. While, stirring, the agar was heated and melted at a high concentration in water. While heated, the agar and water solution was slowly added to and mixed with the ceramic particles in a pre-heated container. The mixture was then heated and pressed in a pre-heated die. After pressing, the compacted composite material was allowed to cool while still under pressure.

The agar within the composite material was further dried by heating the compacted composite material to temperature below the melting temperature of the agar binder, thereby allowing any remaining water to evaporate. The agar binder, no longer swollen with water, had a reduced volume, thereby creating a number of channels within the composite material. Despite the reduction in volume of the polymer binder, the structural integrity of the highly packed ceramic particles prevents the overall structure of the composite material from contracting. The composite material was then impregnated with a dielectric fluid to fill any voids that remained between the polymer binder and ceramic particle surfaces by submerging the composite in the dielectric fluid. The dielectric fluid was a mixture of alkylene carbonates consisting of 50% ethylene carbonate and 50% propylene carbonate.

It will be appreciated that the materials, devices, and methods of the present invention are capable of being incorporated in the form of a variety of embodiments, only a few of which have been illustrated and described above. The invention may be embodied in other specific forms without departing from its spirit or essential characteristics. The described embodiments are to be considered in all respects only as illustrative and not restrictive and the scope of the invention is, therefore indicated by the appended claims rather than by the foregoing description. All changes which come within the meaning and range of equivalency of the claims are to be embraced within their scope.

What is claimed is:

1. A composite material having a high dielectric constant greater than 20 and high dielectric strength of at least 1 MV/cm , the composite material comprising:
    a distribution of high dielectric constant ceramic particles dispersed in a polymeric material;
    the polymeric material, wherein the polymeric material is cured and bonds directly to the distribution of high dielectric constant ceramic particles;
    wherein the distribution of high dielectric constant ceramic particles is a trimodal distribution; and
    wherein a diameter of the ceramic particles of a largest diameter distribution of the trimodal distribution is between 40 μm and 220 μm.

2. The composite material of claim 1, wherein the dielectric constant is greater than 45 at 200 MHz.

3. The composite material of claim 1, wherein the ceramic particles have a diameter from about 2 nm to about 220 μm.

4. The composite material of claim 1, wherein a diameter of the ceramic particles of an intermediary diameter distribution of the trimodal distribution is between 500 nm and 5 μm.

5. The composite material of claim 1, wherein a diameter of the ceramic particles of a smallest diameter distribution of the trimodal distribution is in a range between 2 nm and 500 nm.

6. The composite material of claim 1, wherein the trimodal distribution comprises at least one first ceramic particle having a first diameter in a first range between 40 μm and 220 μm, at least one second ceramic particle having a second diameter in a second range between 500 nm and 5 μm, and at least one third ceramic particle having a third diameter in a third range between 2 nm and 500 nm.

7. The composite material of claim 1, wherein the trimodal distribution comprises at least one first ceramic particle having a first diameter in a first range between 0.5 μm and 3 μm, at least one second ceramic particle having a second diameter in a second range between 65 μm and 150 μm, and at least one third ceramic particle having a third diameter in a third range between 2 nm and 200 nm.

8. The composite material of claim 1, wherein the composite material has uniform density and a uniform dielectric constant throughout the material.

9. The composite material of claim 1, wherein the composite material has a gradient density.

10. The composite material of claim 1, wherein the trimodal distribution of high dielectric constant ceramic particles has a total first volume fraction of 50% or greater and the polymeric material has a second volume fraction of 50% or less.

11. The composite material of claim 1, wherein the ceramic particles are perovskites comprising barium titanate, strontium titanate, barium strontium titanate, lead zirconate titanate, lead magnesium niobate-lead titanate, or combinations thereof.

12. The composite material of claim 1, wherein the polymeric material substantially fills a void space between two or more of the high dielectric constant ceramic particles.

13. The composite material of claim 1, wherein the polymeric material binds directly to a surface of the high dielectric constant ceramic particles.

14. The composite material of claim 1, wherein all surface portions of each of the ceramic particles not in contact with another surface portion of another ceramic particle are contacted with the polymeric material or a dielectric liquid filler.

15. The composite material of claim 1, wherein the polymeric material comprises an inorganic-organic coupling agent.

16. The composite material of claim 1, wherein the composite material is compacted and has a packing factor of at least 80%.

17. The composite material of claim 1, wherein the polymeric material is formed from a polymer precursor derived from coupling agents including silanes, titanates, zirconates, or combinations thereof.

18. The composite material of claim 17, wherein the polymer precursor reacts to form a polysilsesquioxane.

19. The composite material of claim 17, wherein the polymer precursor is formed from a trialkoxysilane selected from a group consisting of triethoxyvinylsilane, vinyltrimethoxysilane, and aminopropyltriethoxysilane.

20. The composite material of claim 1 further comprising a dielectric fluid.

21. The composite material of claim 20, wherein the dielectric fluid has a high dielectric constant.

22. The composite material of claim 21, wherein the dielectric fluid is selected from a group consisting of water, an alkylene carbonate, an oil, or combinations thereof.

23. The composite material of claim 22, wherein the dielectric fluid includes silane, titanate, zirconate, or combinations thereof.

24. The composite material of claim 23, wherein the dielectric fluid fills any voids remaining in the composite material.

25. The composite material of claim 1, wherein the polymeric material forms a gel that swells by absorbing a solvent.

26. The composite material of claim 25, wherein the polymeric material is a biopolymer.

27. The composite material of claim 26, wherein the polymeric material is selected from a group including agar, gelatin, carrageen, or combinations thereof.

28. A method for manufacturing the composite material of claim 1 having a high dielectric constant greater than 20 and high dielectric strength of at least 1 MV/cm, the method comprising:
mixing a trimodal ceramic powder distribution with a liquid polymer precursor into a paste, wherein a diameter of the ceramic particles of a largest diameter distribution of the trimodal distribution is between 40 µm and 220 µm;
placing the paste into a die;
compressing the paste; and,
polymerizing the polymer precursor to form a polymer that binds directly to ceramic particles of the ceramic powder distribution; wherein the high dielectric constant composite material comprises the ceramic powder distribution and the polymer.

29. The method of claim 28, wherein the ceramic powder distribution comprises at least one first ceramic particle having a first diameter in a first range between 40 µm and 220 µm, at least one second ceramic particle having a second diameter in a second range between 500 nm and 5 µm, and at least one third ceramic particle having a third diameter in a third range between 2 nm and 500 nm.

30. The method of claim 28, wherein the ceramic powder distribution comprises at least one first ceramic particle having a first diameter in a first range between 0.5 µm and 3 µm, at least one second ceramic particle having a second diameter in a second range between 65 µm and 150 µm, and at least one third ceramic particle having a third diameter in a third range between 2 nm and 200 nm.

31. The method of claim 28 further comprising:
compacting the ceramic powder distribution such that the compacted distribution has a packing factor of at least 80%.

32. The method of claim 28 further comprising:
impregnating the composite material with a dielectric liquid to fill voids in the composite material and eliminate air from the composite material.

33. The method of claim 28, further comprising:
spin coating the composite material.

34. The method of claim 28 further comprising:
solution casting the composite material.

35. The method of claim 28 wherein polymerizing the polymer precursor to form the polymer comprises at least one of heating the die containing the pressed paste for at least thirty minutes and cooling the high dielectric constant composite material, providing a chemical catalyst, or exposing the polymer precursor to ultraviolet light.

36. The method of claim 28 further comprising:
removing the composite material from the die;
machining the composite material into a desired shape;
sanding the composite material; and,
applying one or more electrodes to the composite material.

37. The method of claim 28, wherein the paste is compressed by a die press.

38. The method of claim 37, wherein the paste is compressed by a pressure of about 30 tons per square inch.

39. The method of claim 28 further comprising:
mixing a first distribution of large ceramic particles having the diameter between 40 µm and 220 µm, a second distribution of intermediate ceramic particles, and a third distribution of small ceramic particles to form the trimodal ceramic powder distribution.

40. The method of claim 39, wherein a diameter of the intermediate ceramic particles is between 500 nm and 5 µm.

41. The method of claim 39, wherein a diameter of the small ceramic particles is between 2 nm and 500 nm.

42. A method for manufacturing the composite material of claim 1 having a high dielectric constant and comprising a ceramic powder distribution and a polymer binder, the method comprising:
mixing a first distribution of large ceramic particles, wherein a diameter of the large ceramic particles is between 40 µm and 220 µm; a second distribution of intermediate ceramic particles, and a third distribution of small ceramic particles to form the ceramic powder distribution;
compacting the ceramic powder distribution such that the compacted distribution has a packing factor of at least 80%;
mixing the ceramic powder distribution with a liquid polymer precursor to form a paste;
placing the paste into a die;
compressing the paste; and,
polymerizing the polymer precursor to form the polymer binder that binds directly to a surface of each of the ceramic particles of the ceramic powder distribution, wherein the polymer precursor is polymerized by heating the die containing the pressed paste for at least thirty minutes and cooling the high dielectric constant composite material, providing a chemical catalyst, exposing the polymer precursor to ultraviolet light, or combinations thereof.

43. The method of claim 42 further comprising:
removing the composite material from the die;
machining the composite material into a desired shape;
sanding the composite material; and,
applying one or more electrodes to the composite material.

44. A method for manufacturing the composite material of claim 1 having a high dielectric constant and high dielectric strength, the method comprising:
mixing a trimodal ceramic powder distribution with a melted polymer in a solvent to form a paste;
placing the paste into a die;
compressing the paste; and,
cooling the mixture to allow the melted polymer to solidify; wherein the high dielectric constant composite material comprises the ceramic powder distribution and the polymer.

45. The method of claim 44, wherein the ceramic powder distribution comprises at least one first ceramic particle having a first diameter in a first range between 40 µm and 220 µm, at least one second ceramic particle having a second diameter in a second range between 500 nm and 5 µm, and at least one third ceramic particle having a third diameter in a third range between 2 nm and 500 nm.

46. The method of claim 44, wherein the ceramic powder distribution comprises at least one first ceramic particle having a first diameter in a first range between 0.5 µm and 3 µm, at least one second ceramic particle having a second diameter in a second range between 65 µm and 150 µm, and at least one third ceramic particle having a third diameter in a third range between 2 nm and 200 nm.

47. The method of claim 44 further comprising:
compacting the ceramic powder distribution such that the compacted distribution has a packing factor of at least 80%.

48. The method of claim 44 further comprising:
impregnating the composite material with a dielectric liquid to fill voids in the composite material and eliminate air from the composite material.

49. The method of claim 44 further comprising:
spin coating the composite material.

50. The method of claim 44 further comprising:
solution casting the composite material.

51. The method of claim 44 further comprising:
removing the composite material from the die;
heating the composite material below the melting temperature of the polymer to remove the solvent;
impregnating the composite with a dielectric fluid to fill voids;
machining the composite material into a desired shape;
sanding the composite material;
applying one or more electrodes to the composite material; and
sealing the composite.

52. The method of claim 44, wherein the paste is compressed by a die press.

53. The method of claim 52, wherein the paste is compressed by a pressure of about 30 tons per square inch.

54. The method of claim 44 further comprising:
mixing a first distribution of large ceramic particles, a second distribution of intermediate ceramic particles, and a third distribution of small ceramic particles to form the trimodal ceramic powder distribution.

55. The method of claim 54, wherein a diameter of the large ceramic particles is between 40 µm and 220 µm.

56. The method of claim 54, wherein a diameter of the intermediate ceramic particles is between 500 nm and 5 µm.

57. The method of claim 54, wherein a diameter of the small ceramic particles is less between 2 nm and 500 nm.

* * * * *